No. 800,902.           PATENTED OCT. 3, 1905.
R. N. CHAMBERLAIN.
SYSTEM OF ELECTRICAL DISTRIBUTION.
APPLICATION FILED JAN. 12, 1904.
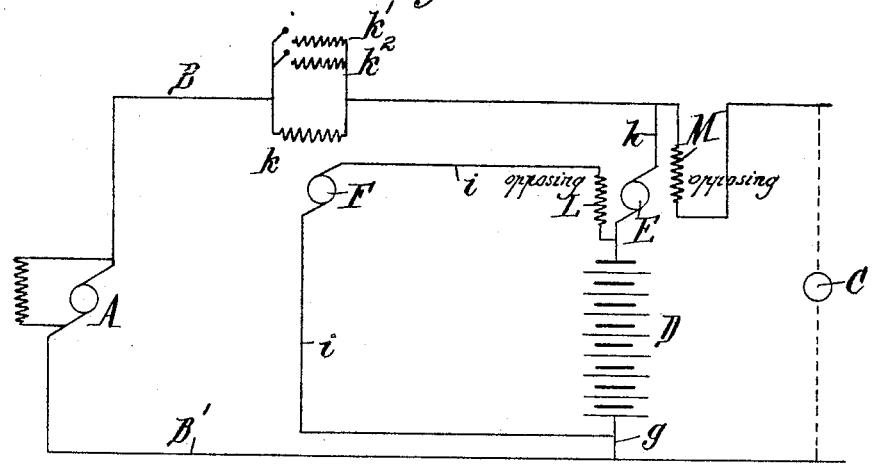
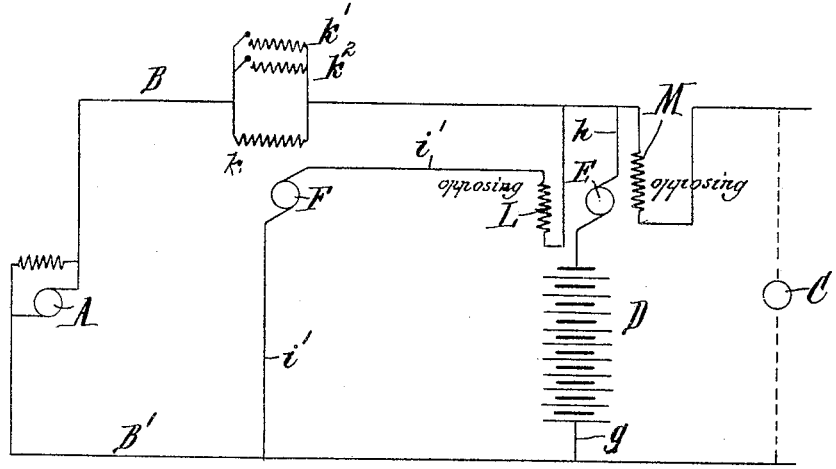
Witnesses:—
Rufus N. Chamberlain, Inventor.
by Wilhelm, Parker & Hard
Attorneys.

UNITED STATES PATENT OFFICE.

RUFUS N. CHAMBERLAIN, OF DEPEW, NEW YORK, ASSIGNOR TO GOULD STORAGE BATTERY COMPANY, OF NEW YORK, N. Y.

SYSTEM OF ELECTRICAL DISTRIBUTION.

No. 800,902.      Specification of Letters Patent.      Patented Oct. 3, 1905.

Application filed January 12, 1904. Serial No. 188,690.

*To all whom it may concern:*

Be it known that I, RUFUS N. CHAMBERLAIN, a citizen of the United States, and a resident of Depew, in the county of Erie and State of New York, have invented a new and useful Improvement in Systems of Electrical Distribution, of which the following is a specification.

This invention relates to electrical-distribution systems in which the load on the consumption-circuit varies greatly at different times—as, for instance, in systems which are used for traction purposes—and more particularly to that class of systems in which a storage battery, a booster-dynamo, and a counter-electromotive-force dynamo are employed for equalizing the action of the system under the varying conditions of load.

The object of my invention is to produce a simple, efficient, and comparatively inexpensive electrical-distribution system of this character.

In the accompanying drawings, Figure 1 is a diagrammatic representation of a distribution system embodying my invention in its preferred form. Fig. 2 is a diagrammatic representation of a modified form of the system.

Like letters of reference refer to like parts in both figures.

In the construction represented in Fig. 1 A represents the main generator; B B', the main conductors or feeders connecting the same with the translating device or line-load C, which may be of any suitable character; D, the storage battery; E, the booster-dynamo, and F the counter-electromotive-force dynamo or generator.

The battery is connected with the main conductor B' by a conductor $g$ and with the main conductor B by a conductor $h$, in which the armature of the booster E is arranged. The armature of the counter-electromotive-force generator F is arranged in a shunt-conductor $i$, connecting the conductors $g$ $h$ around the battery, one terminal of the conductor $i$ being connected with the conductor $h$ between the booster and the battery.

The counter-electromotive-force generator F is excited by a series coil $k$, formed in the main conductor B and preferably provided with shunt-coils $k'$ $k^2$ for regulating the effect of the series coil $k$.

The booster is excited by two coils L M, which act differentially, the coil L being arranged in the battery shunt-conductor $i$, in which the counter-electromotive-force generator is arranged, and the coil M in the main conductor B. The booster can be a compound-wound generator of any ordinary construction in which the connections of the series coils are reversed, so as to cause the coils to act differentially.

The operation of this system is as follows: When the load on the main generator is about equal to the predetermined average load, the current flowing through the exciting-coil $k$ of the counter-electromotive-force generator F will develop in said generator a voltage which is lower than the battery-voltage operating on the coil L of the booster and resists the same. The excess by which the battery-voltage acting on this coil exceeds the opposing effect of the counter-electromotive-force generator on the same has, however, no effect on the booster, because this excess is balanced by the opposing effect of the current passing through the series coil M of the booster. The booster therefore produces practically no current, and the battery is inactive, neither discharging nor receiving current, or, as it is called, the battery "floats" on the main line. When the load exceeds the predetermined average, the increased current passing through the exciting-coil $k$ of the counter-electromotive-force generator raises the voltage of this generator, thereby increasing the resistance which this generator opposes to the action of the battery on the coil L of the booster. This causes a corresponding reduction of the effect of the battery on this coil and a corresponding preponderance of the effect of the series coil M over that of the opposing coil L. The booster now acts in series with the battery, and the combined voltage of the booster and battery is sufficient to supply to the main line enough current to make up for the increase of the load. When the load on the main line is less than the average, the current passing through the exciting-coil $k$ of the counter-electromotive-force generator produces a voltage in the latter which is so much below the battery-voltage that the effect of the battery-voltage on the coil L of the booster preponderates over that of the series coil M of the booster. This causes the booster to operate in series with the main generator in charging the battery, the latter receiving the excess of output of the main generator over the load.

This system possesses several important advantages, one of which is that it utilizes the fluctuations of voltage which occur in the battery when discharging or being charged. It is well known that in charging a battery the voltage rises considerably, while in discharging the voltage drops, so that the voltage is much higher during the charging period than during the discharging period of the battery. When the load increases above the average, the effect of the series coil M of the booster must be increased as compared with the effect of the opposing coil L in order that the series coil may preponderate and cause the booster to aid the battery in discharging. This desired preponderance is effected in this system not only by the increased effect of the main current on the exciting-coil $k$ of the counter-electromotive-force generator, whereby the resistance which the latter opposes to the battery-voltage acting on the coil L of the booster is increased, but also by the decrease of the battery-voltage in discharging, which decrease of voltage reduces the effect of the coil L correspondingly. On the other hand, when the load is low and the battery receives current from the main generator the rise of the battery-voltage due to the condition of charging increases the effect of the coil L correspondingly, so that the effect of this coil on the booster is increased not only by the reduction of the resistance offered by the counter-electromotive-force generator, but also by the rise of the battery-voltage due to charging. This system therefore introduces an important controlling factor by utilizing the variations of battery-voltage due to charging or discharging, according to the varying conditions of load.

In the modified construction of the system shown in Fig. 2 the counter-electromotive-force generator F and the coil L, which it opposes, are not arranged in a shunt-conductor around the battery, but in a shunt-conductor $i''$ across the main generator. While this arrangement produces a differential action of the exciting-coils L M of the booster, it lacks the above-described advantages which follow from the arrangement of the counter-electromotive-force generator and opposing coil in a shunt-conductor across the battery.

Either described system of distribution is exceedingly simple and comparatively inexpensive, because no apparatus of special or unusual construction is required and the counter-electromotive-force generator can be comparatively small.

I claim as my invention—

1. A system of electrical distribution comprising a main generator, a storage battery, a booster provided with differentially-acting energizing-coils, and a counter-electromotive-force generator operating to resist the current passing through one of said coils, substantially as set forth.

2. The combination of a main generator, main feeders, a storage battery connected therewith, a shunt-conductor connected with the terminals of the battery, a counter-electromotive-force generator arranged in said shunt-conductor, and a booster having opposing coils, one arranged in said shunt-conductor and the other in one of the main feeders, substantially as set forth.

3. The combination of a main generator, main feeders, a storage battery, a booster provided with two opposing coils, one connected with terminals of the battery and the other in series with the main generator, and a counter-electromotive-force generator provided with an exciting-coil in series with the main generator, substantially as set forth.

4. The combination of a main generator, main feeders, a storage battery, a booster provided with two opposing coils, one through which current flows from the main generator and the other through which current flows from the battery when discharging, and a counter-electromotive-force generator which opposes such battery-current, substantially as set forth.

5. The combination of a main generator, main feeders, a storage battery, a booster which is excited by the differential action of two opposing coils, one of which receives current from the main generator and the other from the battery when discharging, and a counter-electromotive-force generator which opposes said battery-current and which is excited by a coil through which current flows from the main generator, substantially as set forth.

Witness my hand this 9th day of January, 1904.

RUFUS N. CHAMBERLAIN.

Witnesses:
 EDWARD WILHELM,
 C. B. HORNBECK.